United States Patent

Fiedler et al.

[15] 3,648,631
[45] Mar. 14, 1972

[54] VOLUME DISPLACEMENT SEED PLANTER, MATRIX, AND METHOD OF PLANTING SEED

[72] Inventors: Melvin L. Fiedler, 1515 Larkspur Street, McAllen, Tex. 78501; Joe N. Summers, Jr., 906 Bryce Drive, Mission, Tex. 78572

[22] Filed: Nov. 6, 1968

[21] Appl. No.: 773,889

[52] U.S. Cl............................111/6, 103/117, 111/37, 111/78, 221/185, 222/177, 222/407, 111/1
[51] Int. Cl.............................A01c 7/18, A01c 23/00
[58] Field of Search..................47/9; 111/1, 6, 7, 34, 36–37, 111/51, 77–78; 222/407, 349, 176–178; 103/117; 221/185

[56] References Cited

UNITED STATES PATENTS

| | | | |
|---|---|---|---|
| 2,252,374 | 8/1941 | Hipple | 111/51 |
| 2,499,163 | 2/1950 | Rand | 103/117 |
| 2,509,627 | 5/1950 | Bickerton et al. | 111/7 |
| 2,599,600 | 6/1952 | Arnold | 103/117 |
| 3,149,588 | 9/1964 | Gatzke | 111/1 |
| 3,351,031 | 11/1967 | Phillips et al. | 111/1 |
| 3,391,831 | 7/1968 | Wolf | 222/349 X |
| 3,442,221 | 5/1969 | Phillips et al. | 103/117 |

OTHER PUBLICATIONS

Sowing Seeds in Fluid, Farm Implement and Machinery Review, July 1, 1963, page 959

Primary Examiner—Robert E. Bagwill
Attorney—Bacon & Thomas

[57] ABSTRACT

A seed planter and method for planting seeds, wherein the seeds to be planted are first suspended substantially uniformly in a suitable gel matrix, the seed-bearing matrix then being directly injected at planting depth into a prepared seed bed according to a desired planting pattern.

The planter includes a tank for the seed-bearing gel matrix, to which is connected a positive displacement dispenser pump for each row of seed to be planted, the outlet of the pump being connected to a dispenser nozzle carried behind a soil opener. The planter is moved through a prepared, dry field, and includes a gauge wheel that engages the ground and is connected through suitable drive means to operate the dispenser pump according to a desired planting pattern to automatically dispense measured amounts of the seed-bearing el matrix as the planter moves across the gel

5 Claims, 9 Drawing Figures

Patented March 14, 1972

INVENTORS
MELVIN L. FIEDLER
BY JOE N. SUMMERS, JR.

Bacon & Thomas
ATTORNEYS

VOLUME DISPLACEMENT SEED PLANTER, MATRIX, AND METHOD OF PLANTING SEED

BACKGROUND OF THE INVENTION

1. Field of the Invention

This invention relates generally to a method and apparatus for precisely planting seeds according to a preselected planting pattern, and particularly for the planting of small seeds such as those of lettuce, strawberries and the like.

More particularly, it relates to a method and apparatus for planting seeds wherein the seeds to be planted can be partially germinated if desired, and wherein soil nutrients and other chemicals desirable for proper plant growth and development can be planted with the seeds in one operation.

2. Description of the Prior Art

The two principal common methods for planting seeds are to broadcast or throw them at random across a prepared seed bed, or to place them directly into the soil at a selected depth. The latter method is utilized in grain drills, commonly used to plant wheat and like crops, and in planters used in row crop farming, wherein seeds are planted in distinct, spaced rows. The present invention relates to the second method of planting, wherein the seeds are placed directly into the soil, and is shown and described herein as applied to a planter for row crop farming. However, the principles of the invention can also be employed in grain drills, and other planting devices of the same general type used to directly place seed at a desired depth in the soil.

In row crop farming, at present, the seeds normally are planted utilizing a mechanical planter, wherein dry seed is carried in a hopper mounted above a soil-breaking planting shoe having a seed dispensing opening in the heel thereof. A gravity tube usually connects the seed hopper with the planting shoe, and a revolving plate or other mechanical mechanism is operated as the planter is moved through the field to dispense seeds, in measured quantity, through the gravity tube to the planting shoe opening.

The best of such mechanical seed planters frequently fail to plant the desired number of seeds at the intended soil position, because of improper feeding of seed to the gravity tube and/or clogging of said tube, resulting in improper plant populations or undesirable plant locations. This problem is aggravated when the seeds are extremely small in size, as with lettuce and strawberries, for example.

In some instances it is desirable to coat the seeds with soil nutrients and other chemicals prior to planting so that the nutrients and chemicals are available to the planted seed. This can be done with most mechanical planters in use today, provided the seed in the hopper is kept relatively dry. If the seeds to be planted are too moist or if they have germinated to such an extent that they stick or cling to one another, the mechanical dispensing means and the gravity feed system will clog and cease to work.

Because some modern soil chemicals and plant nutrients can clog or otherwise impair the seed-planting mechanism, or because their form and nature make them unsuitable for dispensing together with seed through the mechanism of a conventional planter, separate dispensing mechanisms for such chemicals and nutrients are now commonly used to place them in the soil separately from the seed. The resulting multiplicity of dispensing and planting devices is usually cumbersome and subject to breakdown, and frequently the chemicals and nutrients are not placed in proper relation to the seeds.

The need thus exists for an improved method and apparatus for planting seeds, which is capable of economically and precisely planting seeds of any size in a seed bed, whether the seeds are partially germinated or not, and which preferably can also simultaneously and accurately dispense such chemicals and soil nutrients as are deemed necessary for proper plant growth and development. The present invention satisfies that need.

SUMMARY OF THE INVENTION

The present invention completely departs from the conventional concept of seed planters which gravity-feed dry seed to the soil. Instead, the seeds to be planted are first mixed with a gel carrier and uniformly suspended therein to form a seed-carrier matrix which is then injected in strip or ribbon form directly into a trench in the seed bed at the precise location and depth desired.

The matrix may comprise any suitable material that will form a gel and maintain the seeds in uniform suspension therein prior to planting, and which will not interfere with the germination of the seeds under normal soil conditions. With the proper matrix and proper mixing procedures, the seeds will be distributed evenly throughout the matrix. Hence, the number of seeds planted in a given length of trench is easily controlled by proper choice of the seed-to-gel carrier ratio. Plant nutrients, insecticides, herbicides and like chemicals for insuring proper plant growth and development can be mixed with the seed-bearing matrix before planting so that they are injected into the soil together with the seeds. Even partially germinated seed can be planted by the present method, since the need for dry, nonsticking seed is eliminated, the mixing of such seed with the matrix material tending to separate such seeds from each other.

The planter apparatus of the invention includes a frame on which a blender tank is mounted for mixing the seeds with the gel carrier, and with whatever nutrients and chemicals are desired, the tank having at least one outlet to which a dispenser pump is connected. The frame supports at least one ground-engaging gauge wheel, which is connected through suitable driving means to operate the dispenser pump, and a trench-forming soil opener is also attached to the planter frame and has a discharge nozzle mounted on the heel end thereof connected by a delivery conduit to the outlet of the dispenser pump. The soil should be dry and flowable so that the seed in the trench is covered by gravity flow of the soil into the trench behind the discharge nozzle. However, the trench can be closed by using a follower wheel, if desired or required by soil conditions.

When in use, the planter is connected to a tractor or the like, and is moved through the field with the soil opener engaged to a desired depth in the seed bed. Forward motion of the planter causes the gauge wheel to rotate, which in turn operates the dispenser pump to extrude the seed-bearing matrix through the discharge nozzle. Usually, two or more rows of seeds will be planted with one pass of the planter, the planter having a separate dispenser pump, soil opener, and discharge nozzle for each row.

The driving connection between the gauge wheel and each dispenser pump can assume different configurations. One embodiment of the invention features a mechanical arrangement, wherein the gauge wheel is connected to operate a drive gear that in turn is engaged with a gear carried by the power shaft of the dispenser pump. The drive gear is connected to rotate with the gauge wheel, so that it is in motion whenever the planter is being moved through the field during a planting operation. If it is desired to continually extrude the seed-bearing matrix, so that a continuous row of plants will result, the teeth on both the drive gear and the pump gear will extend completely around the circumference thereof, so that the dispenser pump will be operated and seed-bearing matrix will be continuously extruded while the planter is moving forward.

On the other hand, it is frequently desirable to skip-plant, i.e., have the plants in a row separated by unplanted areas. This can be accomplished with the mechanical arrangement by utilizing circumferentially spaced groups of teeth on the drive gear to intermittently drive the dispenser pump. When a group of teeth on the rotating drive gear engages the pump gear, the dispenser pump will be operated and seed matrix will be dispensed, the length of the extrusion depending upon the arcuate length of the drive gear tooth group. When the spaces between the drive gear tooth groups are presented to the pump gear, the pump gear will not be driven and no seed will be planted, thus leaving a gap between groups of seeds.

In a second embodiment of the invention, the output shaft of an electric clutch is connected to the dispenser pump drive shaft, and the input shaft of the clutch is connected to be driven whenever the planter gauge wheel is rotated. The electric clutch is operated by a photocell and punched tape arrangement, the latter also being driven by the planter gauge wheel. The punched tape in cooperation with the photocell and appropriate circuitry operate the electric clutch, and hence the dispenser pump, according to a predesigned planting program.

It is an object of the present invention to provide a method and apparatus for precisely and accurately planting partially germinated or ungerminated seeds of nearly any size directly in a prepared seed bed, with or without soil nutrients or other chemicals.

A further object is to provide a seed planter designed for use with the seed planting method of the invention, which planter utilizes a minimum of components and can accommodate various kinds of seeds, soil nutrients and chemicals.

Still another object is to provide a seed planter designed to give full and accurate control over plant spacing in a given row, and which can simultaneously plant multiple rows of seeds in staggered spacing with precision.

A still further object is to provide a seed planter, matrix and method that will avoid wasting seed and space the seeds for maximum crop yield.

Yet another object is to provide electrical controls for a seed planter, designed to effect precise regulation of seed location and, hence, plant spacing.

Other objects and many of the attendant advantages of the invention will become readily apparent from the following description when taken in conjunction with the attached drawings:

DESCRIPTION OF THE PREFERRED EMBODIMENTS

Figures 1, 6:
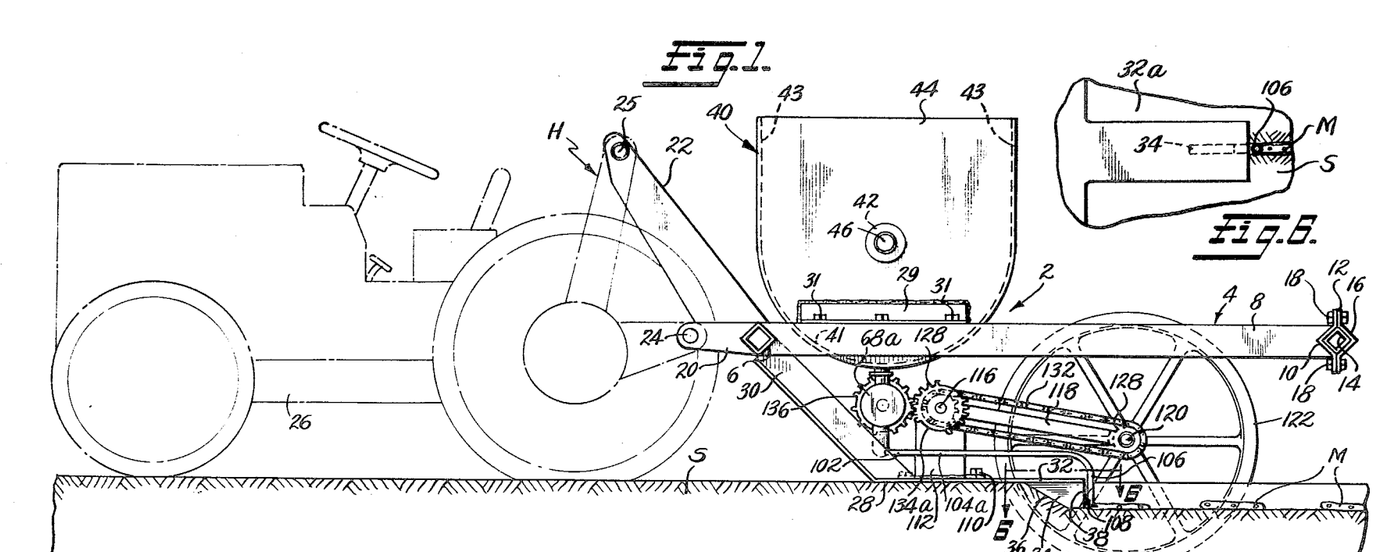
FIG. 1 is a side elevational view of a first embodiment of the present seed planter, showing a mechanical driving connection between the planter gauge wheel and the power shaft of the dispenser pump, designed to provide intermittent seed planting.
FIG. 6 is an enlarged fragmentary plan view of one of the soil openers.

Referring to FIGS. 1 and 6 of the drawings, a seed planter constructed according to the invention is indicated generally at 2, and includes a frame 4 comprising a front rectangular tool bar or cross beam 6 to which the forward ends of a pair of rearwardly extending parallel side beams 8 are welded. The side beams 8 each have one section 10 of a clamp 12 welded to the rear ends thereof, and a rear rectangular crossbeam 14 is secured to the clamp sections 10 by the other clamp sections 16 and bolts 18. A pair of spaced stub connector bars 20 is welded to project forwardly from the front crossbeam 6. A pair of inclined upright members 22 is disposed between the bars 20 and is welded to the front crossbeam 6 at its middle.

The stub bars 20 and the members 22 are connected by pins 24 and 25, respectively, to the corresponding elements of a conventional three-point hitch assembly H mounted on the rear of a tractor 26, whereby the planter 2 is attached to and supported by the tractor. The tractor 26 includes a hydraulic system (not shown) connected to operate the three-point hitch assembly H thereof, whereby the planter 2 can be raised and lowered.

Mounted beneath the planter frame 4 is a flat soil plate 28, which extends across the full width of the frame 4 and is secured to the front crossbeam 6 by welded angle iron braces 30. The soil plate 28 has a width about one-third the length of the side beams 8, as viewed in FIG. 1, and is disposed centrally beneath the frame 4. A plurality of rectangular shoe plates 32a, 32b, 32c and 32d project rearwardly from the soil plate 28, one for each row of seed to be planted, and each has a knifelike soil opener 34 secured to the undersurface thereof. Each of the soil openers 34 has an inclined forward edge 36 and a vertical heel edge 38, and is designed to open the soil S of a seed bed to form a trench to receive seed-bearing matrix.

While the planter concept of the invention can be adapted for use with different kinds of soils and seed beds, in the present drawings the planter 2 is designed to be used to plant prepared mounded beds B disposed between lister furrows F. Thus, the soil plate 28 glides over the relatively flat top surface of the beds B, and the soil openers 34 are symmetrically spaced apart a suitable distance depending upon the center-to-center distance measured from each bed B to the next. The mounded beds B are formed utilizing conventional bedder-lister tillage equipment, which forms no part of the invention.

Figure 2:
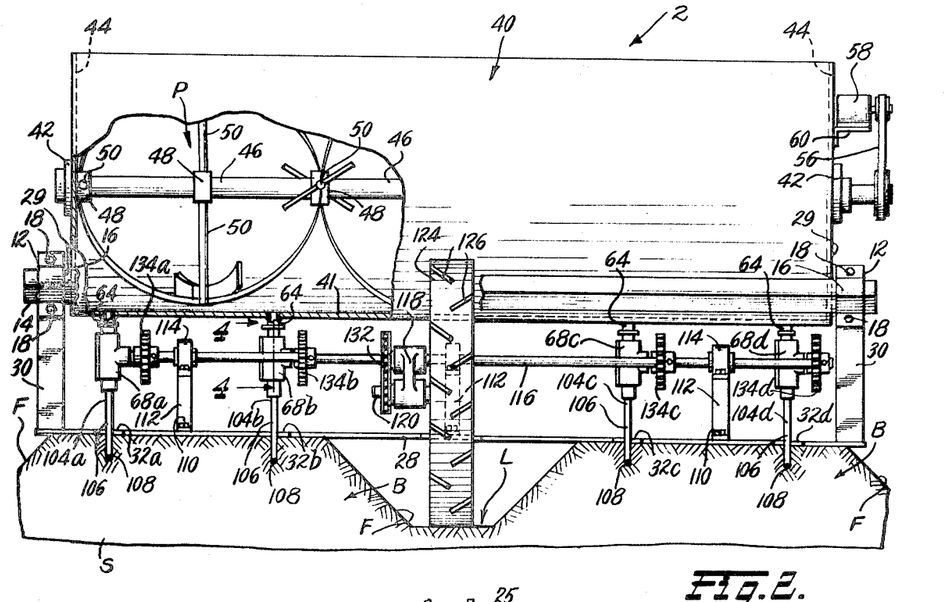
FIG. 2 is a fragmentary rear elevational view, partly in section, showing a ribbon-type paddle assembly within the blender tank of the planter of FIG. 1.
Figure 3:
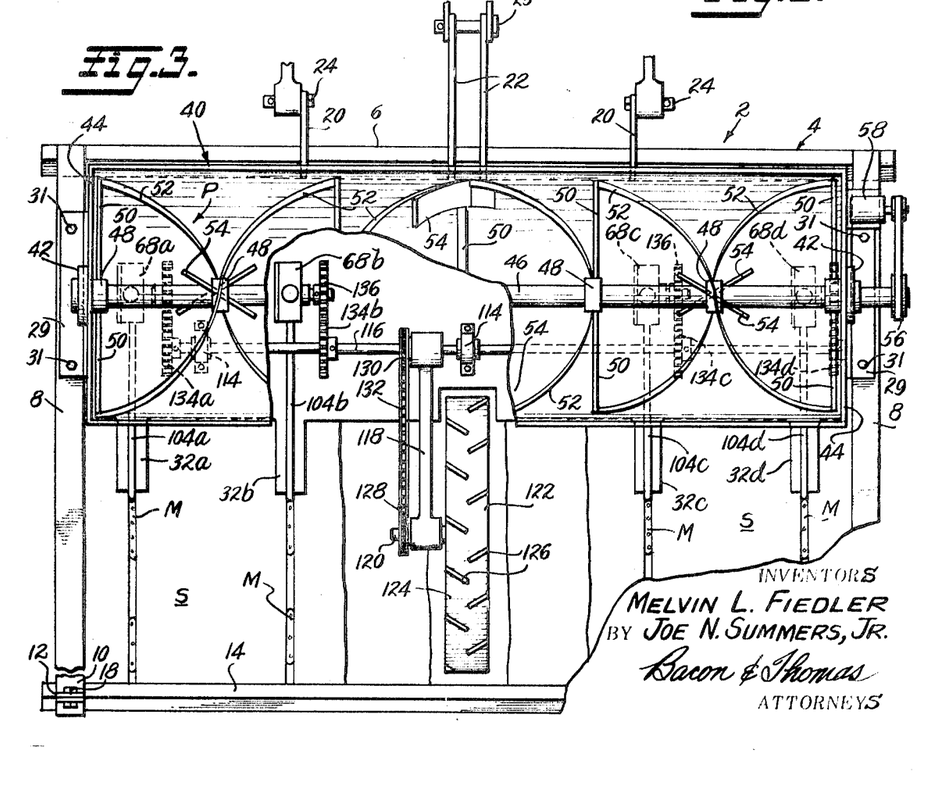
FIG. 3 is a fragmentary plan view of the planter of FIGS. 1 and 2, showing further details thereof.

Secured to the frame 4 above the soil plate 28 by angle irons 29 and bolts 31 is a blender tank 40 comprising a U-shaped plate forming a bottom wall 41 and sidewalls 43 of the tank, and having bearing units 42 mounted on the end walls 44 thereof for receiving the opposite end portions of a shaft 46. The shaft 46 supports a ribbon-type mixing paddle assembly P, and has a plurality of spaced hubs 48 thereon to which the inner ends of oppositely extending support bars 50 are welded. Ribbon paddle elements 52 and 54 are secured to the outer ends of the support bars 50, in the manner usual for such a paddle assembly, the paddle assembly P being effective when the shaft 46 is rotated to mix whatever ingredient materials are placed in the tank 40. The shaft 46 is usually rotated only to mix or blend a batch of seed and matrix before beginning a planting operation, and remains stationary at other times. As is shown in FIGS. 2 and 3, the shaft 46 is connected by a belt 56 to an electric motor 58 mounted on a bracket 60 attached to one end wall 44 of the blender tank 40, the motor 58 being connected to the electrical system of the tractor 26 and being effective to rotate the shaft 46, preferably at a speed of about 100 r.p.m. Alternatively, the electric motor 58 can be replaced by a hydraulic motor, and connected with the hydraulic system of the tractor, or a crank can be connected to the shaft 46 for manual operation of the paddle assembly P.

The bottom wall 41 of the blender tank 40 has a plurality of outlet nipples 64 welded thereto, one for each row of seed-bearing matrix to be planted. The planter 2, as shown and described, is designed to plant four rows of seeds, and thus there are four nipples 64, on each of which is received an inlet 66 of dispenser pumps 68a, 68b, 68c and 68d, respectively, the pumps being secured in place on their associated nipples 64 by set screws 69. The dispenser pumps 68a, 68b, 68c and 68d are identical, and each includes a body 70 on which the inlet 66 is formed, the body also including an outlet 72 disposed diametrically from the inlet 66. The body 70 contains a chamber 74 of uniform depth extending inwardly from one face 76 thereof, the chamber 74 being closed by a cover plate 78.

A boss 80 extends centrally from the rear face 82 of the body 70, and has a bore 84 therethrough for receiving a shaft 85. Mounted on the shaft 85 within the chamber 74 is an impeller 86 made of rubber or some other suitable flexible, resilient material, the impeller 86 including a hollow hub 88 that is received on the shaft 85 and secured thereto by a set screw 90. Four equally spaced impeller vanes 92 of equal length extend radially from the hub 88; the hub 88 and the vanes 92 having a width substantially equal to the distance between the cover plate 78 and the bottom wall 96 of the chamber 74.

Figure 4:
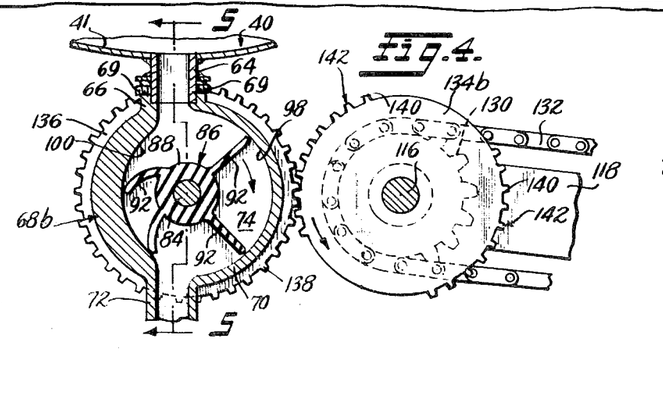
FIG. 4 is an enlarged vertical sectional view through one of the dispenser pumps, taken on the line 4—4 of FIG. 2, and showing in detail the design of the drive gear and its mating pump gear.
Figure 5:
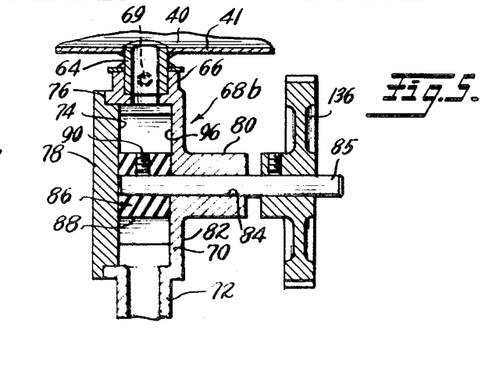
FIG. 5 is a vertical sectional view through the dispenser pump and pump gear, taken on the line 5—5 of FIG. 4.

The impeller 86 as viewed in FIG. 4 is intended to rotate clockwise, when the shaft 84 is so rotated. The side wall portion 98 of the chamber 74 extending from the pump inlet 66 to the pump outlet 72 is drawn on a uniform radius from the center of the shaft 85 such that the outer tips of the vanes 92 are in sliding contact with said wall portion. The portion 100 of the cavity sidewall extending between the outlet 72 and the inlet 62 is also arcuate, but is located substantially closer to the shaft 85 than the wall 98. Thus, the chamber 74 has an eccentric shape, so that when each impeller vane 92 engages the surface 100, it is flexed or deformed. This deformation reduces the volume of the cavity formed between the deformed vane 92 and its trailing vane in the region of the pump outlet 72, which in turn causes material in the cavity to be forced into said outlet. Rotation of the impeller 86 functions to draw material from the tank 40, and to pump it under pressure through the pump outlet 72.

One end 102 of a discharge conduit 104a, 104b, 104c and 104d is connected to the pump outlet 72 of each pump 68a, 68b, 68c and 68d, respectively. The other end portion 106 of each conduit is disposed vertically and is fastened to the heel edge 38 of its associated soil opener 34, and terminates in a discharge nozzle 108. Thus, seed-bearing matrix forced into the outlet 72 of each pump 68a, 68b, 68c and 68d by interaction between its impeller 86 and the chamber wall portion 100 passes through the associated conduit 104a, 104b, 104c and 104d; and is extruded or ejected through the nozzle 108 as an elongated deposit M into the trench formed by the soil opener 34.

The end of the nozzles 108 is spaced slightly above the lower edge of the soil openers 34 to facilitate laying of the deposit M in the trench.

Secured to the soil plate 28 rearwardly of the dispenser pumps by bolts 110 is a pair of horizontally aligned upright supports 112, on which pillow block bearings 114 are mounted. The bearing 114 support a horizontal jack shaft 116. Journaled on the jack shaft 116 medially thereof is one end of a support arm 118, FIG. 3, to the other end of which is journaled an axle 120 on one end of which is mounted a ground-engaging gauge wheel 122 having a cylindrical rim 124 to which traction cleats 126 are secured. The other end of the axle 120 has a sprocket gear 128 secured thereto, in alignment with a second sprocket gear 130 secured to the jack shaft 116, the sprocket gears 128 and 130 being connected by a drive chain 132.

Thus, when the gauge wheel 122 rotates, the jack shaft 116 will also be rotated. Because the distance between the jack shaft 116 and the axle 120 is fixed, the gauge wheel 122 can be raised and lowered without interfering with the drive chain connection between the sprocket gears 128 and 130. The jack shaft 116 will be driven even while the gauge wheel 122 is moving up or down to accommodate variations in the level of the soil surface.

Mounted on the jack shaft 116 are four drive gears 134a, 134b, 134c, and 134d, one for each of the dispenser pumps 68a, 68b, 68c and 68d, respectively. Mounted on the shaft 85 of each dispenser pump is a gear 136, arranged to confront and mesh with its associated drive gear 134a, 134b, 134c, and 134d. Thus, when the teeth on the drive gears 134a, 134b, 135c and 134d and on the gears 136 are engaged and the jack shaft 116 is rotated, the dispenser pumps 68a, 68b, 68c, and 68d will be operated to extrude seed-bearing matrix deposits M.

The gears 134a, 134b, 134c and 134d and 136 are designed to provide intermittent operation of their associated dispenser pumps as the planter 2 is moved through the field, whereby a period of matrix extrusion will be followed by a period of no extrusion to provide a desired spacing between plants. To this end, the pump gears 136 are provided with teeth 138 spaced uniformly about the complete circumference thereof, while the drive gears 134a, 134b, 134 c and 134d have mating spaced teeth 140 thereon, but located in circumferentially spaced groups 142 on the periphery of the drive gears.

The teeth 140 are disposed so that the arc length of each group 142 thereof corresponds to the length of matrix deposit M it is desired to extrude during each planting period, and the arc length measured between the groups 142 is chosen to correspond to the spacing desired between deposits. Thus, as the drive gears 134a, 134b, 134c and 134d are rotated by the jack shaft 116 in response to movement of the planter 2 through the field, they will operate the dispenser pumps 68a, 68b, 68c and 68d to effect planting of a seed-bearing matrix deposit M according to a preset program. The planting program can be varied by changing the design of the drive gears 134a, 134b, 134c and 134d. For example, if continuous planting of seed is desired, the drive gears merely are designed with the teeth 140 extending completely therearound.

It is also possible to obtain staggered planting with the planter 2 whereby, for example, the dispenser pumps 68a and 68c will be in operation while the dispenser pumps 68b and 68d are idle. This is accomplished merely by rotating the drive gears 134a and 134c on the jack shaft 116 until the tooth groups 142 thereon lie opposite the spaces between tooth groups on the drive gears 134b and 134d. It is seen that by proper design and positioning of the drive gears 134a, 134b, 134c and 134d, a wide variety of planting patterns can be devised.

Figures 8, 9:
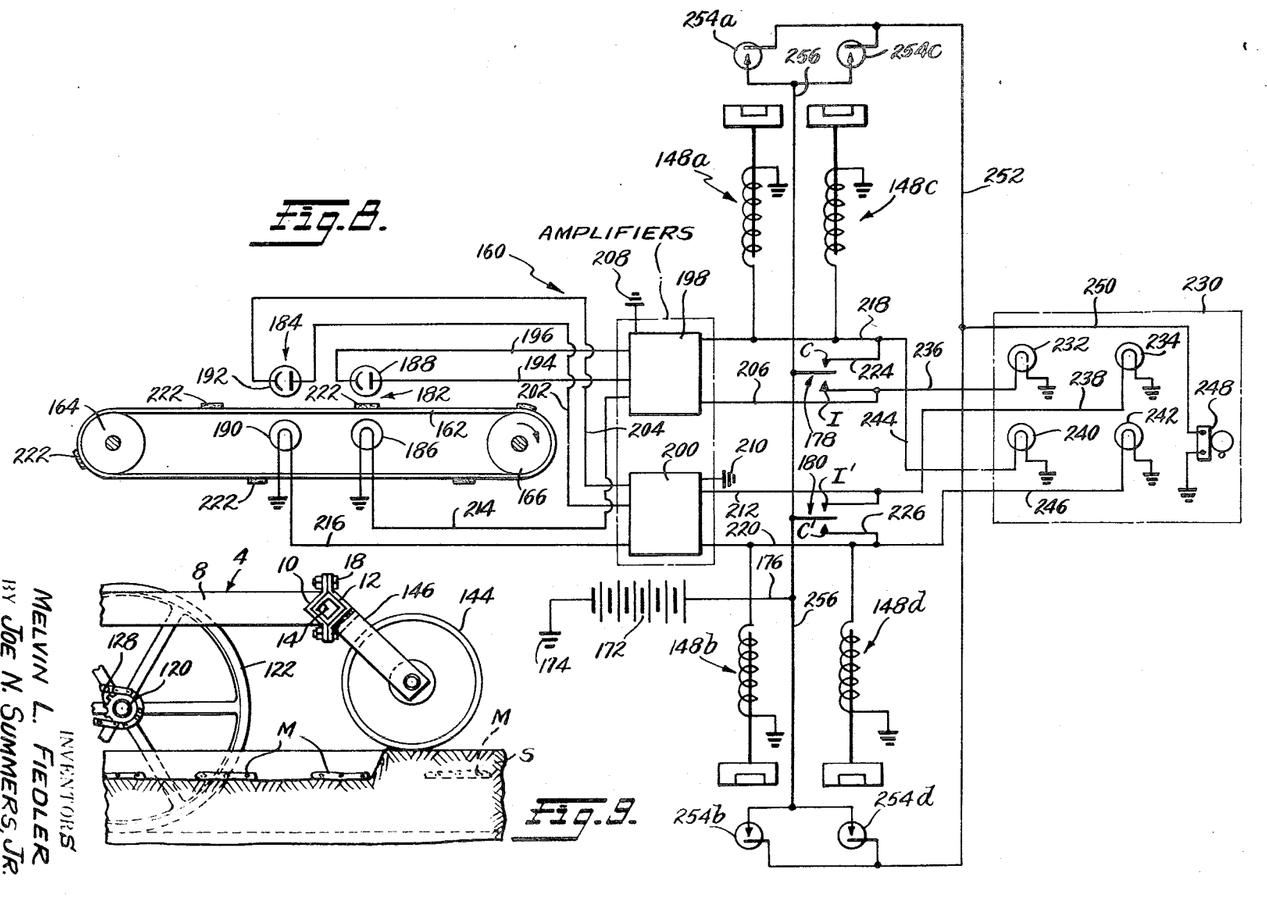
FIG. 8 is a schematic diagram of the electrical control circuit for the apparatus shown in FIG. 7.
FIG. 9 is a fragmentary side elevation view, showing a presser wheel arrangement for closing the seed trench.

The planter 2 will usually be operated in well-prepared, dry soil, whereby after seed-bearing matrix deposit M has been extruded behind the soil opener 34 the soil will fall back by gravity and close the trench to complete the planting procedure. This is accomplished by using a thin, knifelike soil opener 34, having a thickness corresponding to the external diameter of the tube ends 106, or say about one-fourth inch to about one-half inch. However, it may be desirable in some instances not to rely solely on self-closing of the seed trench, and to this end a modification of the planter 2 is shown in FIG. 9, wherein a conventional planter presser wheel 144 is mounted behind each soil opener 34, the wheels 144 being attached by brackets 146 to the planter frame 4. The presser wheels 144 function in the well known manner to close the seed trench, and to gently press the soil into place.

Figure 7:
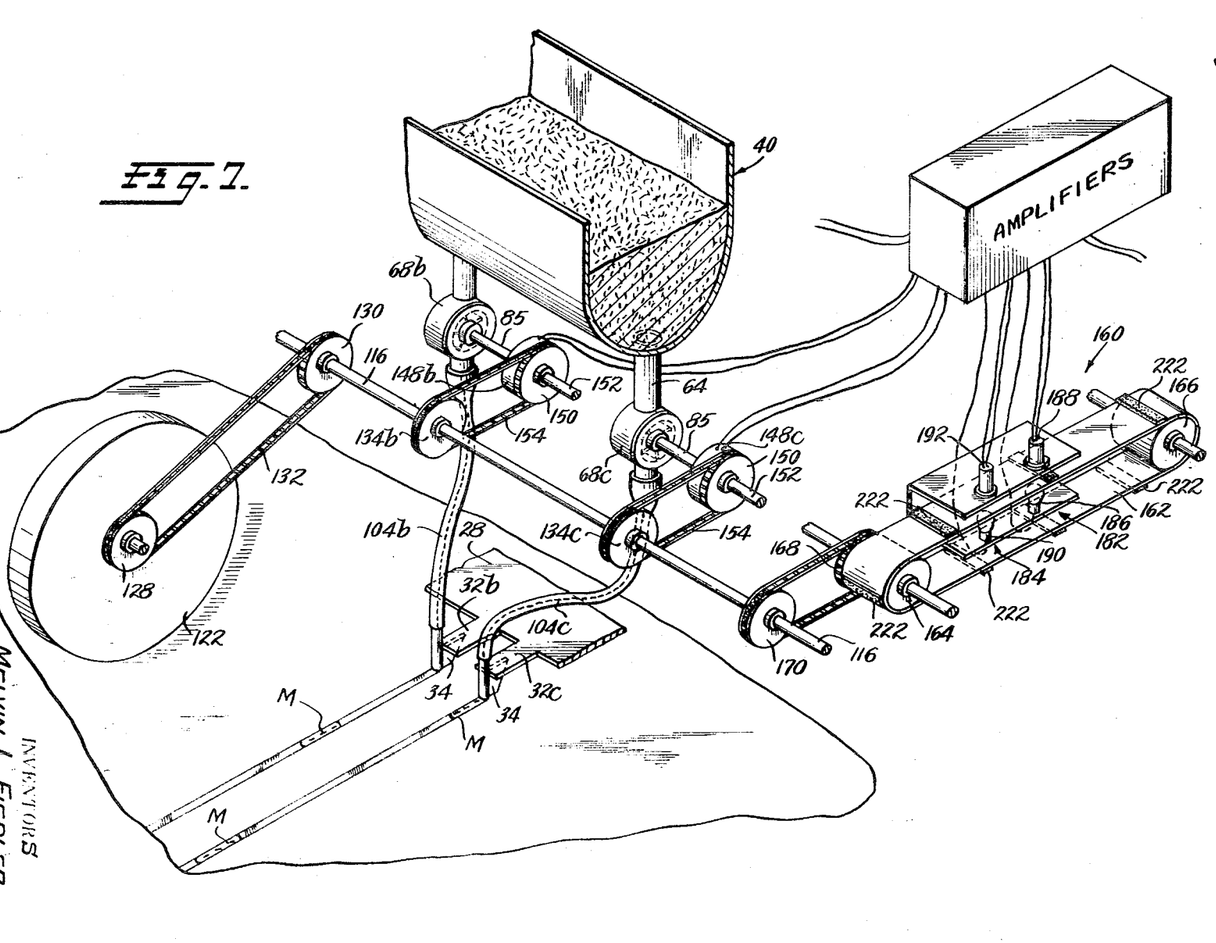
FIG. 7 is a diagrammatic perspective view of a second embodiment of the invention, showing two dispenser pumps and a program tape-controlled electric clutch arrangement for coupling the gauge wheel with the dispenser pumps to operate a four-row seed planter.

The planter 2 as shown in FIG. 1 to 6 and 9 is controlled mechanically to provide a desired planting pattern. It is to be understood that other types of control systems can be utilized, as, for example, the electrically operated, tape actuated control system shown diagrammatically in FIGS. 7 and 8. In FIG. 7, only the dispenser pumps 68b and 68c are shown, while FIG. 8 shows the complete four-pump system.

Referring to FIG. 7, components identical to those shown in FIGS. 1 to 6 bear identical reference numerals. The shafts 85 of the dispenser pumps 68b and 68c, instead of having the gears 136 mounted thereon, are connected to the output side of electric clutches 148b and 148c, said clutches having sprocket gears 150 on the input shafts 152 thereof that are driven by drive chains 154 from the drive gears 134b and 134c. The dispenser pumps 68a and 68d have similar clutches 148a and 148d connected thereto (FIG. 8), and when the clutches are energized while the jack shaft 116 is revolving, their associated dispenser pumps 68a, 68b, 68c and 68d will be operated to dispense matrix deposits M.

The electric clutches 148a, 148b, 148c and 148d can be operated by any desired means. However, a unique tape-actuated control system for operating them to provide a desired, precise planting program is indicated at 160 in FIGS. 7 and 8. The control system 160 includes an endless tape or belt 162 mounted on a power drum 164 and an idler drum 166, the power drum 164 having a gear 168 thereon connected by a chain to a gear 170 mounted on the jack shaft 116. Thus, when the gauge wheel 122 rotates the jack shaft 116, the endless belt 162 will be moved. The belt 162 is made of translucent or clear plastic material, whereby light can shine therethrough.

Referring now to FIG. 8, a battery is indicated at 172, and serves as the power source for the electrical control system. The battery 172 can be the same battery used to power the electrical system of the tractor 26, one side thereof being connected to a ground 174. A lead 176 is connected to the other side of the battery 172, and is connected to the blade of a pair of single pole, double throw switches 178 and 180, the switch 178 being associated with the electric clutches 148a and 148c, and the switch 180 with the electric clutches 148b and 148d. The switch 178 includes two terminals I and C, and the switch 180 has a similar pair of terminals I' and C'.

Positioned to cooperate with the continuous belt 162 are two photocell units 182 and 184, the unit 182 being connected in circuit with the switch 178 and the electric clutches 148a and 148c, and the photocell unit 184 being connected in circuit with the switch 180 and the electric clutches 148b and 148d. The photocell unit 182 includes a lamp 186 disposed between the runs of the belt 162, and a detector cell 188 disposed above the belt, the photocell unit 184 similarly including a lamp 190 and a detector cell 192. The detector cell 188 is connected by leads 194 and 196 to a conventional signal amplifier unit 198, a similar signal amplifier unit 200 being connected by leads 202 and 204 to the detector cell 192.

The amplifier 198 is connected by a power lead 206 to the terminal I of the switch 178, and has a ground 208 also connected thereto. Similarly, the amplifier 200 is connected to a ground 210, and a power lead 212 connects it with the terminal I' of the switch 180. The lamp 186 is connected to the amplifier 198 by a lead 214, and thus is energized together with the amplifier when the blade of the switch 178 is moved to the terminal I. In a like manner, the lamp 190 is connected by a lead 216 to the amplifier 200.

When the switches 178 and 180 are in their I and I' contact positions, respectively, the signal amplifiers 198 and 200, and the photocell units 182 and 184, respectively, are operational. Under such conditions, the lamps 186 and 190 are lighted, and so long as they shine uninterruptedly into their detector cells nothing transpires. If the light beam of either photocell unit 182 or 184 is interrupted, however, then the signal amplifiers 198 and 200 will generate a signal to operate their respective associated electric clutches.

The output of the signal amplifier 198 is connected by a lead 218 to the magnetic or electric clutches 148a and 148c; whereas, a lead 220 connects the output of the amplifier 200 to the magnetic or electric clutches 148b and 148d. Because a signal is supplied to the clutches only when their photocell beams are interrupted, it follows that the clutches can be operated by rendering portions of the belt 162 opaque. This is done by placing strips 222 of opaque tape on the outer surface of the belt 162.

By properly locating the opaque strips 222 and the photocell units 182 and 184, nearly any planting pattern can be precisely programmed. In FIGS. 7 and 8 the photocell units 182 and 184 are spaced longitudinally of the belt 162, to provide for staggered planting. If even, rather than staggered, planting is wanted, then the photocell units 182 and 184 are placed in side-by-side relationship.

To illustrate a typical planting situation, assume that the drive drum 164 is geared to be driven at one-fourth the speed of the gauge wheel 122. This will result in the belt 162 moving one-fourth inch for each inch of ground travel. Assume further that for each row it is desired to plant for two inches, with 4 inches of space between plantings. With these parameters, the desired planting pattern for each row can be obtained by placing opaque strips 222 one-half inch in width on the belt 162, on 1½ inch centers. If the seeds in the rows a and c are to be staggered relative to the seeds in the rows b and d, then the photocell unit 182 is spaced longitudinally from the photocell unit 184 a distance equal to one-half the center-to-center spacing between the opaque tape strips 222, or in this instance, three-fourths of an inch.

When the blades of the switches 178 and 180 are in contact with the terminals I and I', respectively, the control system 160 operates in an intermittent mode, as controlled by the belt 162. The control system can also be operated in a continuous mode, whereby seed-bearing matrix is continuously extruded. To place the system in its continuous mode, the blades of the switches 178 and 180 are moved to the terminals C and C', respectively. The terminals C and C' are connected to the signal leads 218 and 220 by leads 224 and 226, respectively, whereby the electric clutches 148a, 148b, 148c and 148d will be continuously energized when the system 160 is in its continuous operation mode.

It is most desirable for an operator seated on the tractor 26 to know how the planter mechanism is operating, and the embodiment of FIGS. 7 and 8 includes a tractor-mounted indicator panel 230 for this purpose. Mounted on the panel 230 are signal lights 232 and 234, connected by leads 236 and 238 to the switch terminals I and I', respectively. Thus, the signal lights 232 and 234 will be energized when the switches 178 and 180, respectively, are placed in their intermittent operation mode.

A second pair of signal lights 240 and 242 is also mounted on the panel 230, said lights being connected by leads 244 and 246 to the signal leads 218 and 220, respectively. Thus, the signal light 240 will indicate when the electric clutches 148a and 148c are energized, and the signal light 242 will indicate when the electric clutches 148b and 148d are energized.

The signal panel 230 also mounts a bell or buzzer 248, connected by a lead 250 to a lead 252 that is connected to one terminal of four pressure switches 254a, 254b, 254c and 254d, the other terminals of said pressure switches being connected by a common lead 256 to the power lead 176. The pressure switches 254a, 254b, 254c and 254d are connected into the matrix conduits 104a, 104b, 104c and 104d, respectively, and will close to energize the buzzer 248 whenever an excessive pressure is detected in one of the conduits, such as would occur if one of the nozzles 108 becomes clogged.

Obviously, the control system 160 can be varied in many ways to provide for different planting patterns. Further, a lesser or greater number of dispenser pumps than shown can be operated by each photocell unit.

Turning now to the seed-bearing matrix, as has been described, seed is mixed in the blending tank 40 prior to beginning a planting operation. The concept of the invention is to uniformly and evenly distribute the seed to be planted through a suitable gel carrier, to form a seed-bearing matrix that can be extruded by the planter 2 to effect precision seed planting.

The gel carrier material may be anyone of a number of materials but must be such that it will not damage the seeds or harm plant growth and development. In other words, the gel carrier must be such that it will permit normal germination of the seeds under normal soil conditions. In addition, the carrier material should provide a full body capable of maintaining the seeds therein in dispersed relation, and should be easily pumped. Two gel carrier-materials that have been found most suitable are "Carbopal 960," marketed by the B. F. Goodrich Corporation, and "Norbak," marketed by the Dow Chemical Company. Both materials are a carboxy vinyl polymer of extremely high molecular weight, available as powders of different coarseness with a bulk density of about 13 lb./cu. ft., and a pH of 3 for a 1 percent water solution. These polymers disperse readily in water to yield a low viscosity solution.

"Carbopal 960" is preferred because it is neutralized during manufacture with ammonium hydroxide and requires no further addition of a base material to convert it to a clear stable gel when mixed with water. The ammonium hydroxide converts in the soil to anhydrous ammonia, a commonly used nitrogen fertilizer. "Norbak," when neutralized with a suitable base, such as sodium hydroxide, sodium carbonate, etc., is transformed into a permanent clear stable gel. Neither gel will solidify and harden. For purposes of the present invention, a solution of about 0.5 percent by weight (one-half pound polymer per 100 pounds of water) has been found ideal, with a 10 percent variation in weight of the water or polymer having been found acceptable.

The exact proportions of seed and carrier gel for a particular planting operation depends on several variables, including the size of the discharge nozzle 108, the size of the needs to be planted, the ratio of gauge wheel rotation to dispenser pump rotation, and the desired spacing between the plants developed from the seeds planted in each matrix deposit M. The ratio of seed size to nozzle size should be about 2 to 3. The proportions must be empirically determined for each type of seed, and for the other planting characteristics desired.

The following are specific examples of matrices and crop plantings for a two-row planter construction according to the invention:

EXAMPLE 1

Crop Type: Cabbage—F.M. hybrid.
Planting Pattern: plant 2-inch extrusions, skip 8 inches, two rows staggered planting, about 20 inches apart on a 40-inch wide seed bed.
Desired Plant Emergence Pattern: two to three plants per each 2-inch extrusion.
Injector Nozzle Size: 3/16-inch inside diameter.
Gauge Wheel to Dispenser Pump Ratio: 1 to 1.
Planting Depth: one-half inch.
Volume of Matrix Per Acre: 7.2 gallons.
Amount of Seed Per 7.2 Gallons of Matrix: 1 pound.
Carrier Gel: Carbopal—0.5 percent solution in water.

EXAMPLE 2

Crop Type: Lettuce—6238.
Planting Pattern: plant 2-inch extrusions, skip 14 inches, two rows about 20 inches apart on 40-inch wide seed bed.
Desired Plant Emergence Pattern: three to four plants per each 2-inch extrusion.
Injector Nozzle Size: 3/16-inch inside diameter.
Gauge Wheel to Dispenser Pump Ratio: 1 to 1.
Planting Depth: one-half inch.
Volume of Matrix per acre: 8 gallons.
Amount of Seed per 8 Gallons of Matrix: 2 ounces.
Carrier Gel: Carbopal—0.5 percent solution in water.

EXAMPLE 3

Crop Type: Bell Pepper—seed pregerminated.
Planting Pattern: plant 2-inch extrusions, skip 4 inches, two rows about 20 inches apart on 40-inch wide seed bed.
Desired Plant Emergence Pattern: two to three plants per each 2-inch extrusion.
Injector Nozzle Size: one-fourth-inch inside diameter.
Gauge Wheel To Dispenser Pump Ratio: 1 to 1.
Planting Depth: 1 inch.
Volume of Matrix Per Acre: 20 gallons.
Amount of Seed Per 20 Gallons of Matrix: 1 pound.
Carrier Gel: Norbak—0.5 percent solution in water.

In each of the above Examples, the results in the way of emergence of plants, plant spacing, etc., were very satisfactory. It should be noted that in Example 3 pregerminated seed was planted, a feature which is easily accomplished with the present method and apparatus. Further, if desired, growth stimulants, seedling-protecting insecticides, fungicides, fertilizers, and nearly any kind of compound or chemical to encourage proper plant growth and development can be mixed with the seed and the carrier gel, for simultaneous extrusion with the seed.

In preparing the matrix gel, all of the materials for the matrix are placed in the blending tank 40 where they are blended by the ribbon paddle assembly P, the latter being chosen as a particularly effective paddle configuration for the present application.

Obviously, many modifications and variations of the present invention are possible, without departing from the principles of the invention as shown and described.

We claim:

1. Apparatus for planting seed in a seed bed or the like, comprising: a planter frame movable over said seed bed; a tank carried by said frame for receiving a seed-containing matrix gel, said tank having at least one outlet; a positive displacement dispenser pump having a drive shaft and an inlet and an outlet; means connecting said pump inlet with said tank outlet; at least one soil opener carried by said planter frame arranged to open a trench as said planter frame is moved over said seed bed; conduit means extending from said pump outlet to a point at the trailing end of said soil opener for discharging said matrix gel into said trench; means connected with said drive shaft to drive said dispenser pump at a speed proportional to the rate at which said planter frame is moved over said seed bed, said pump-driving means including a gauge wheel carried by said planter frame, said gauge wheel being engageable with the seed bed to be rotated as said planter frame is moved over said seed bed; means interconnecting said gauge wheel and said dispenser pump drive shaft, whereby as said gauge wheel is rotated, said pump is operated to effect dispensing of the matrix gel, said last-mentioned means comprising; a first gear mounted on the dispenser pump drive shaft, a second gear engaged with said first gear, means carried by the frame supporting said second gear, and means including a chain drivingly interconnecting said gauge wheel with said second gear, said first gear having teeth extending completely around its periphery, and said second gear having circumferentially spaced groups of teeth thereon for intermittently driving said first gear and dispenser pump.

2. Apparatus as recited in claim 1 including paddle means; a paddle shaft supporting said paddle means in said tank for rotation about a horizontal axis for mixing a matrix gel, and for mixing seeds with said gel, and means including a motor connected with said paddle shaft for driving said paddle means.

3. In a seed planter including a seed-planting mechanism, means for driving said seed-planting mechanism, an electric clutch operatively connected between said planting mechanism and said driving means, and an electrical circuit connected with and controlling said electric clutch, means comprising: a power source; a continuous planting-program belt arranged to be driven at a speed proportional to the speed at which the seed planter travels during a planting operation; a photocell unit connected to said power source, and including a lamp on one side of said belt to project a beam of light through said belt, and a detector cell aligned with said lamp on the other side of said belt, said belt being translucent except for selected opaque portions; and means in said circuit connecting said photocell unit with said electric clutch, operable to energize and engage said electric clutch to drive said seed-planting mechanism whenever an opaque belt portion interrupts the light beam between said lamp and said detector cell.

4. Apparatus for planting seed in a seed bed or the like, comprising: a planter frame movable over said seed bed; a tank carried by said frame for receiving a seed-containing matrix gel, said tank having at least one outlet; a positive displacement dispenser pump having a drive shaft and an inlet and an outlet; means connecting said pump inlet with said tank outlet; at least one soil opener carried by said planter frame arranged to open a trench as said planter frame is moved over said seed bed; conduit means extending from said pump outlet to a point at the trailing end of said soil opener for discharging said matrix gel into said trench; means connected with said drive shaft to drive said dispenser pump at a speed proportional to the rate at which said planter frame is moved over said seed bed; an electric clutch having an input side and an output side, said output side being connected with said drive shaft; drive means interconnecting the gauge wheel with the electric clutch input side; and electrical control circuit means connected with said electric clutch and arranged to effect engagement and disengagement of said clutch according to a preset program to intermittently drive the dispenser pump.

5. Apparatus as recited in claim 4 wherein the electrical control circuit means includes: a power source; a continuous program belt arranged to be driven in response to rotation of said gauge wheel and in predetermined ratio thereto; a photocell unit connected to said power source and including a lamp arranged to project a beam through said belt, and a detector cell aligned with said lamp on the other side of said belt, said belt being translucent except for selected opaque portions; and means connecting said photocell unit with said electric clutch, operable to energize and engage said clutch whenever an opaque belt portion interrupts the beam between said lamp and said detector cell to thereby interrupt operation of the dispenser pump.

* * * * *